United States Patent
Nakahara

(10) Patent No.: US 9,551,910 B2
(45) Date of Patent: Jan. 24, 2017

(54) ACTIVE MATRIX SUBSTRATE AND DISPLAY DEVICE

(75) Inventor: Hijiri Nakahara, Osaka (JP)

(73) Assignee: UNIFIED INNOVATIVE TECHNOLOGY, LLC, Wilmington, DE (US)

( * ) Notice: Subject to any disclaimer, the term of this patent is extended or adjusted under 35 U.S.C. 154(b) by 1085 days.

(21) Appl. No.: 13/498,205

(22) PCT Filed: May 18, 2010

(86) PCT No.: PCT/JP2010/058362
§ 371 (c)(1),
(2), (4) Date: Mar. 26, 2012

(87) PCT Pub. No.: WO2011/040085
PCT Pub. Date: Apr. 7, 2011

(65) Prior Publication Data
US 2012/0182274 A1    Jul. 19, 2012

(30) Foreign Application Priority Data
Oct. 2, 2009    (JP) ................................ 2009-230664

(51) Int. Cl.
G02F 1/1343    (2006.01)
G02F 1/1362    (2006.01)

(52) U.S. Cl.
CPC ................... *G02F 1/136213* (2013.01); *G02F 2001/136295* (2013.01)

(58) Field of Classification Search
CPC ................ G09G 5/00; G02F 1/136213; G02F 1/136286; G02F 1/13624; G02F 1/1368; G02F 1/134363; G02F 2001/136295

USPC ...................................................... 349/38–39
See application file for complete search history.

(56) References Cited

U.S. PATENT DOCUMENTS

| 6,590,229 | B1 * | 7/2003 | Yamazaki | ......... G02F 1/136213 257/71 |
| 2001/0030717 | A1 * | 10/2001 | Kaneko et al. | ................. 349/43 |
| 2001/0045995 | A1 |  11/2001 | Numano et al. | |

(Continued)

FOREIGN PATENT DOCUMENTS

| JP | 5-323378 A | 12/1993 |
| JP | 10-142630 A | 5/1998 |

(Continued)

*Primary Examiner* — Charles Chang
(74) *Attorney, Agent, or Firm* — Birch, Stewart, Kolasch & Birch, LLP

(57) ABSTRACT

An active matrix substrate 5 is provided with: a plurality of source wiring lines and a plurality of gate wiring lines, which are arranged in a matrix pattern; and picture elements, each of which has a thin film transistor provided in the vicinity of a part where each source wiring line and each gate wiring line intersect each other, and a picture element electrode 26 connected to the thin film transistor. In the active matrix substrate, a base member 5a is provided such that the source wiring lines and the gate wiring lines intersect each other, and on the base member 5a, the connecting portion 28a of an auxiliary capacitor electrode and the connecting portion 29a of an auxiliary capacitor wiring line are connected to each other by having therebetween a nitride film 33 composed of a high melting point metal material.

20 Claims, 9 Drawing Sheets

(56) References Cited

U.S. PATENT DOCUMENTS

| | | | |
|---|---|---|---|
| 2006/0163741 A1* | 7/2006 | Bae .................... | H01L 27/1288 257/763 |
| 2007/0103614 A1* | 5/2007 | Yoon ................... | H01L 27/1255 349/43 |
| 2007/0236640 A1* | 10/2007 | Kimura ............. | G02F 1/134363 349/141 |
| 2007/0268438 A1* | 11/2007 | Nakamura et al. ........... 349/138 | |

FOREIGN PATENT DOCUMENTS

| JP | 2000-147550 A | 5/2000 |
|---|---|---|
| JP | 2001-194676 A | 7/2001 |

* cited by examiner

ACTIVE MATRIX SUBSTRATE AND DISPLAY DEVICE

TECHNICAL FIELD

The present invention relates to an active matrix substrate onto which has been arrayed a plurality of data wiring lines and a plurality of scan wiring lines in a matrix pattern, and the present invention relates to a display device using such an active matrix substrate.

BACKGROUND ART

Liquid crystal display televisions, monitors, cellular phones, or the like have been widely used in recent years as flat panel displays that are characterized by thinness, light weight, and the like in comparison with the conventional cathode-ray tube display. This type of liquid crystal display device is known to use as a panel display for a liquid crystal panel an active matrix substrate on which are arranged in a matrix pattern pixels that have picture element electrodes including a plurality of data wiring lines (source wiring) and a plurality of scan wiring lines (gate wiring) arranged in a matrix pattern, and switching elements such as thin film transistors (TFTs) arranged in the vicinity of the intersections of the data wiring lines and the scan wiring lines, the picture element electrodes being connected to these switching elements.

Moreover, addition of sufficient auxiliary capacitance and improvement of the aperture ratio are required in order to improve the display quality of the liquid crystal display device using the active matrix substrate configured in this manner.

On the conventional active matrix substrate as described, for example, in the below listed Patent Document 1, an auxiliary capacitor wiring formed from aluminum or an alloy layer mainly constituted by aluminum and an auxiliary capacitor electrode formed from a transparent electrically conductive film formed from indium tin oxide (ITO) or the like are connected together with a high melting point metal layer therebetween (formed from a high melting point material such as molybdenum or the like or an alloy thereof). In this conventional active matrix substrate, it has been possible to prevent dissolution of the auxiliary capacitor wiring line and reduction of the auxiliary capacitor electrode, caused by a development solution used during patterning of the auxiliary capacitor wiring lines, and to prevent the resulting deterioration of transparency of the auxiliary capacitor electrode and the accompanying great decrease of transmittance of the picture element.

RELATED ART DOCUMENT

Patent Document

Patent Document 1: Japanese Patent Application Laid-Open Publication No. 2001-194676

SUMMARY OF THE INVENTION

Problems to be Solved by the Invention

However, due to a high melting point metal layer being connected to the auxiliary capacitor electrode of the conventional active matrix substrate in the aforementioned manner, bonding between such an auxiliary capacitor electrode and the high melting point metal layer has been insufficient. As a result, a problem of decrease of electrical connectivity between the auxiliary capacitor electrode and the auxiliary capacitor wiring line has occurred for this conventional active matrix substrate.

In consideration of the aforementioned problem, an object of the present invention is to provide an active matrix substrate capable of preventing the lowering of electrically connectivity between the auxiliary capacitor electrode and the auxiliary capacitor wiring line and to provide a display device that uses such an active matrix substrate.

Means for Solving the Problems

In order to attain the aforementioned object, the active matrix substrate of the present invention is an active matrix substrate for use as a substrate of a display panel, including: a plurality of data wiring lines and a plurality of scan wiring lines, which are arranged in a matrix pattern, picture elements, each of which has a switching element provided in the vicinity of a part where each data wiring line and each scan wiring line intersect each other, and a picture element electrode connected to the switching element; and a base member provided with the data wiring lines and the scan wiring lines intersecting one another, wherein on the base member for each pixel are provided an auxiliary capacitor electrode having a transparent electrode for causing generation of an auxiliary capacitance, and having an auxiliary capacitor wiring line comprising an aluminum alloy, and wherein the auxiliary capacitor electrode and the auxiliary capacitor wiring line are connected to each other by a nitride film of a metal material interposed therebetween.

The auxiliary capacitor electrode and the auxiliary capacitor wiring line of the active matrix substrate configured in the aforementioned manner are connected together with the nitride film of a metal material formed between the auxiliary capacitor electrode and the auxiliary capacitor wiring line. By this means, the auxiliary capacitor electrode and the auxiliary capacitor wiring line can be reliably connected together with the nitride film therebetween while maintaining bonding between the nitride film and the auxiliary capacitor electrode. As a result, the present invention differs from the aforementioned conventional example, and it is possible to prevent lowering of electrical connectivity between the auxiliary capacitor electrode and the auxiliary capacitor wiring line.

Moreover, a high melting point metal material that has a melting point greater than or equal to 1,000° C. is preferably used as the metal material in the aforementioned active matrix substrate.

In this case, bonding between the nitride film and the auxiliary capacitor electrode can be readily ensured.

In the aforementioned active matrix substrate, nitrogen content of the aforementioned nitride film is preferably greater than or equal to 5 percent by weight and less than or equal to 90 percent by weight.

In this case, adhesion between the nitride film and the auxiliary capacitor electrode can be readily ensured.

Moreover, in the aforementioned active matrix substrate, at the location of connection on the base member between the auxiliary capacitor electrode and the auxiliary capacitor wiring line, the auxiliary capacitor wiring line is preferably arranged above the auxiliary capacitor electrode, and the auxiliary capacitor wiring line is preferably connected to the auxiliary capacitor electrode with the nitride film interposed therebetween.

In this case, layers are stacked on the base member in order as the auxiliary capacitor electrode, the nitride film, and the auxiliary capacitor wiring line; and adhesion between the auxiliary capacitor electrode and the nitride film can be readily ensured.

Moreover, in the aforementioned active matrix substrate, a transparent electrically conductive film is used as the aforementioned auxiliary capacitor electrode, and the auxiliary capacitor wiring line may include at least one of carbon, silicon, cobalt, nickel, germanium, rhodium, palladium, and tin as an additive.

In this case, it is possible to reliably prevent lowering of electrical connectivity between the auxiliary capacitor electrode and the auxiliary capacitor wiring line while suppressing increase in the value of resistance between the auxiliary capacitor electrode and the auxiliary capacitor wiring line.

Moreover, in the aforementioned active matrix substrate, total content of the additive in the auxiliary capacitor wiring line is preferably greater than or equal to 0.2 percent by weight and less than or equal to 5.0 percent by weight.

In this case, it is possible to reliably prevent lowering of electrical connectivity between the auxiliary capacitor electrode and the auxiliary capacitor wiring line while suppressing increase in the value of resistance between the auxiliary capacitor electrode and the auxiliary capacitor wiring line.

Moreover, in the aforementioned matrix substrate, the scan wiring line is preferably formed from the same material as the auxiliary capacitor wiring line.

In this case, it is possible to form the auxiliary capacitor wiring line and the scan wiring line simultaneously, and it is possible to simplify the process of manufacture of the active matrix substrate.

Moreover, the display device of the present invention is characterized in that the display device is equipped with a display part, and any one of the aforementioned active matrix substrates is used in the display part.

In the display device configured in the aforementioned manner, the active matrix substrate, which is used in the display, is capable of preventing a lowering of electrical connectivity between the auxiliary capacitor electrode and the auxiliary capacitor wiring line. It is thus possible to readily construct a display device that has a display part that has excellent display quality.

Effects of the Invention

According to the present invention, it becomes possible to provide an active matrix substrate and a display device utilizing the active matrix display device that is capable of preventing a lowering of electrical connectivity between the auxiliary capacitor electrode and the auxiliary capacitor wiring line.

DETAILED DESCRIPTION OF EMBODIMENTS

Preferred embodiments of the active matrix substrate and the display device of the present invention are described below with reference to the figures. The present invention is explained below by citing use of the invention in a transmission type liquid crystal display device. Dimensions of the constituent components within the various figures do not faithfully indicate the dimensions of the actual constituent components, actual ratios of dimensions of various constituent components, or the like.

Figure 1:
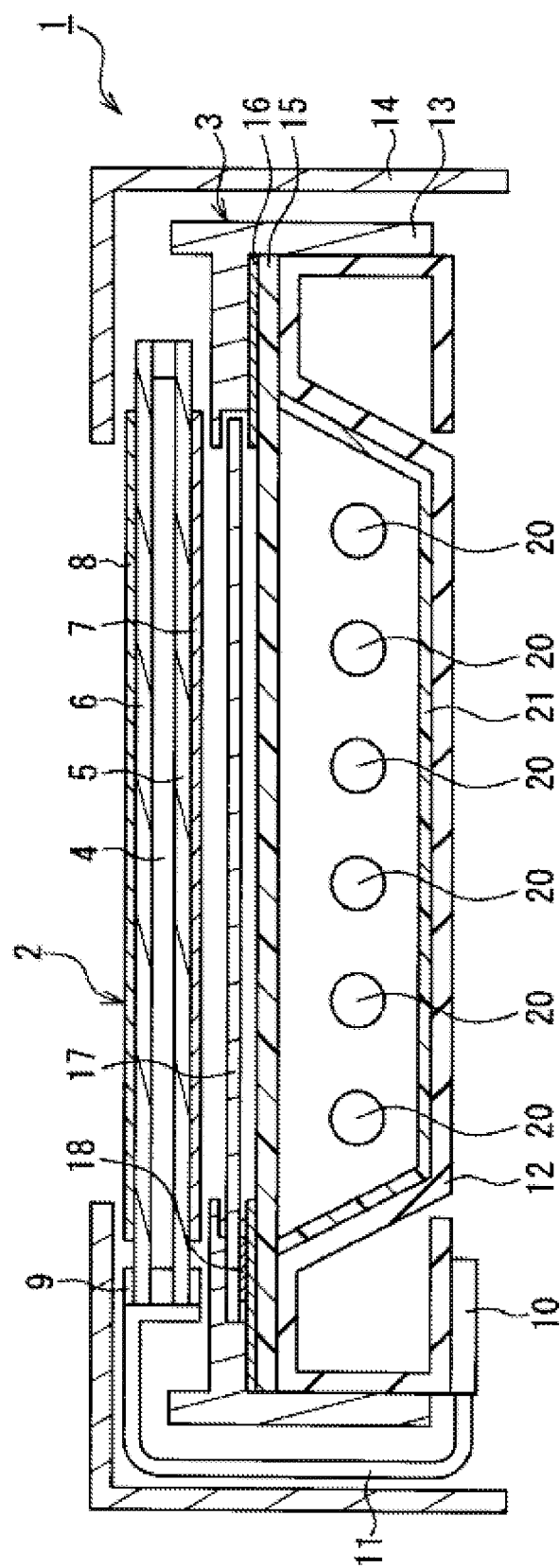
FIG. 1 is a schematic cross-sectional diagram for explanation of a liquid crystal display device according to an embodiment of the present invention.

FIG. 1 is a schematic cross-sectional view for explanation of a liquid crystal display of an embodiment of the present invention. In this figure, the liquid crystal display device 1 of the present embodiment is equipped with a liquid crystal panel 2 as a display part that is placed at the upper side in the figure, which is the visible side (display face side) and an illumination device 3 that is placed at the non-display side (the lower side in the drawing) of the liquid crystal panel 2 for generation of illumination light to illuminate the liquid crystal panel 2.

The liquid crystal panel 2 is equipped with a liquid crystal layer 4, the active matrix substrate 5 of the present invention and a color filter substrate 6 sandwiching and retaining the liquid crystal layer 4. A polarizing plate 7 is provided at the exterior face of the active matrix substrate 5, and a polarizing plate 8 is provided at the exterior face of the color filter substrate 6. The liquid crystal panel 2 is provided with a driver device 9 for driving the liquid crystal panel 2 and is provided with a drive circuit device 10 connected through a flexible printed substrate 11 to the driver device 9. The liquid crystal panel 2 is constructed so as to be capable of driving the liquid crystal layer 4 in picture element units. The polarized state of the aforementioned illuminating light entering the liquid crystal panel 2 and having passed through the polarizing plate 7 is modulated by the liquid crystal layer 4, and the desired screen image is displayed by control of the amount of light passing through the polarizing plate 8.

The illumination device 3 is equipped with a chassis 12, which has a bottom and has an apertured part at the upper side as seen in the figure (i.e., liquid crystal panel 2 side), and a frame-shaped frame 13, which is installed at the liquid crystal panel 2 side of the chassis 12. The chassis 12 and the frame 13 are constructed from metal or synthetic plastic. The liquid crystal panel 2 is placed above the frame 13 and is sandwiched between the frame 13 and a bezel 14, which has an L-shaped cross-sectional profile. The illumination device 3 is assembled with the liquid crystal panel 2 in this manner to make an integrated transmission type liquid crystal display device 1 using illumination light that enters the liquid crystal panel 2 from the illumination device 3.

Moreover, the illumination device 3 is equipped with a diffuser panel 15 placed so as to cover the aperture part of the chassis 12. The illumination device 3 is also equipped with an optical sheet 17 placed above the diffuser panel 15 at the liquid crystal panel 2 side, and a reflective sheet 21 placed at the inner face of the chassis 12. Multiple cold cathode fluorescent lamp tubes 20, e.g., 6 tubes, are arranged within the chassis 12 of the illumination device 3 below the liquid crystal panel 2 to form a directly-below type illumination device 3. The light from each of the cold cathode fluorescent lamp tubes 20 of the illumination device 3 is emitted as the aforementioned illumination light from the light emitting face of the illumination device 3 facing the liquid crystal panel 2.

Although the above explanation described a configuration using a directly-below type illumination device 3, the present embodiment is not limited to this configuration, and an edge-light type illumination device having a light guide plate may be used.

The diffuser panel 15, for example, is constructed from a synthetic plastic or glass material as a rectangular shaped sheet of about 2 mm thickness. The diffuser panel 15 diffuses light coming from the cold cathode fluorescent lamp tubes 20 and emits light toward the optical sheet 17. The 4 sides of the diffuser panel 15 are mounted on the frame-shaped surface provided at the upper part of the chassis 12, and the diffuser panel 15 is incorporated within the illumination device 3 by sandwiching and retention of the diffuser panel 15 between this surface of the chassis 12 and the inner face of the frame 13 via pressure member 16 capable of elastic deformation. The roughly central part of the diffuser panel 15 is supported by a (not illustrated) transparent support member to prevent the diffuser panel 15 from being squeezed toward the interior of the chassis 12.

The diffuser panel 15 is retained between the chassis 12 and the pressure member 16 so that the diffuser panel 15 is capable of movement. Even if (plastic) expansion or contraction type deformation of the diffuser panel 15 takes place due to effects such as increased temperature within the chassis 12, generation of heat by the cold cathode fluorescent lamp tubes 20, or the like, the plastic deformation is absorbed due to elastic deformation of the pressure member 16, so that lowering of the ability to diffuse light from the cold cathode fluorescent lamp tubes 20 can be avoided as much as possible. The use of a diffuser panel 15 that is constructed of a glass material that is strongly heat resistant in comparison to synthetic plastic is preferred from the standpoint of resistance to bowing, yellowing, and thermal deformation due to the effects of such heat.

The optical sheet 17 includes a light condensing sheet formed, for example, from synthetic plastic film of about 0.5 mm thickness. The optical sheet 17 is constructed so as to increase brightness of the aforementioned illumination light sent to the liquid crystal panel 2. Moreover, as may be required, the optical sheet 17 may be formed appropriately by stacking of widely known optical sheet materials such as prism sheets, diffusion sheets, polarization sheets, or the like, in order to improve the quality of the display displayed by the display face of the liquid crystal panel 2. The optical sheet 17 is constructed so as to send the light output from the diffuser panel 15 as illumination light to the liquid crystal panel 2 after conversion to planar light that has uniform brightness and at least a prescribed degree of brightness (e.g., 5,000 cd/m$^2$). Moreover, although not described above, an optical member such as a diffuser sheet or the like, for example, can be appropriately stacked above the liquid crystal panel 2 (display face side) in order to adjust the viewing angle of this liquid crystal panel 2.

Moreover, a protrusion that protrudes toward the left side of FIG. 1 is formed, for example, in the optical sheet 17 at the central part of the left edge side of FIG. 1, which becomes the upward side during actual use of the liquid crystal display device 1. Then, for optical sheet 17, only the aforementioned protrusion sandwiches and supports by pressure member 16 and the inner face of the frame 13, is supported through an elastic material 18, and this optical sheet 17 can be incorporated within the illumination device 3 in a state capable of shrinking and stretching. By this means, even if (plastic) expansion and contraction of the optical sheet 17 occurs due to the aforementioned effects of heat such as the heat generated by the cold cathode fluorescent lamp tubes 20 or the like, free expansion-contraction deformation becomes possible on the basis of the aforementioned protrusion part so that the occurrence of wrinkling or deflection of the optical sheet 17, is prevented as much as possible. As a result, according to this liquid crystal display device 1, it becomes possible to prevent, as much as possible, the occurrence of a lowering of the display quality in the display of the liquid crystal panel 2 such as the occurrence of bright spots or the like caused by deflection of the optical sheet 17 or the like.

Straight tubes are used for each of the cold cathode fluorescent lamp tubes 20, and the electrode parts (not illustrated) arranged at both ends of the tubes are supported by the exterior side of the chassis 12. Moreover a narrow tube type high light-emission efficiency lamp tube of about 3.0 to 4.0 mm diameter is used for each of the cold cathode fluorescent lamp tubes 20, and each of the cold cathode fluorescent lamp tubes 20 is retained within the chassis 12 by use of a light source retention member, not shown in the drawing, so as to maintain prescribed distances between the cold cathode fluorescent lamp tubes 20 and the diffuser panel 15 and the reflective sheet 21. Furthermore, the cold cathode fluorescent lamp tubes 20 are disposed parallel to one another so that the lengthwise direction is orthogonal to the direction of action of gravity. This prevents the mercury (vapor) sealed within the cold cathode fluorescent lamp tubes 20 from accumulating at one tip in the longitudinal direction of the cold cathode fluorescent lamp tubes 20, due to the action of gravity, and operating life of the lamp can be greatly increased.

The reflective sheet 21, for example, is constructed from a metal thin film having high reflectivity, such as aluminum, silver, or the like, of a thickness of about 0.2 to 0.5 mm. The reflective sheet 21 functions as a reflector for reflection of light of the cold cathode fluorescent lamp tubes 20 toward the diffuser panel 15. By this means, it is possible for the illumination device 3 to efficiently reflect light emitted by the cold cathode fluorescent lamp tubes 20 toward the diffuser panel 15 side, and it is possible to increase the light use efficiency and the brightness of the diffuser panel 15. Instead of the aforementioned metal thin film, as described above, it is also possible to use a reflective sheet material made of synthetic plastic, or for example, to coat a highly reflective white paint or the like on the inner face of the chassis 12 so that the inner face of the chassis 12 functions as a reflector plate.

Next, the active matrix substrate 5 of the present embodiment will be described concretely while referring to FIG. 2.

Figure 2:
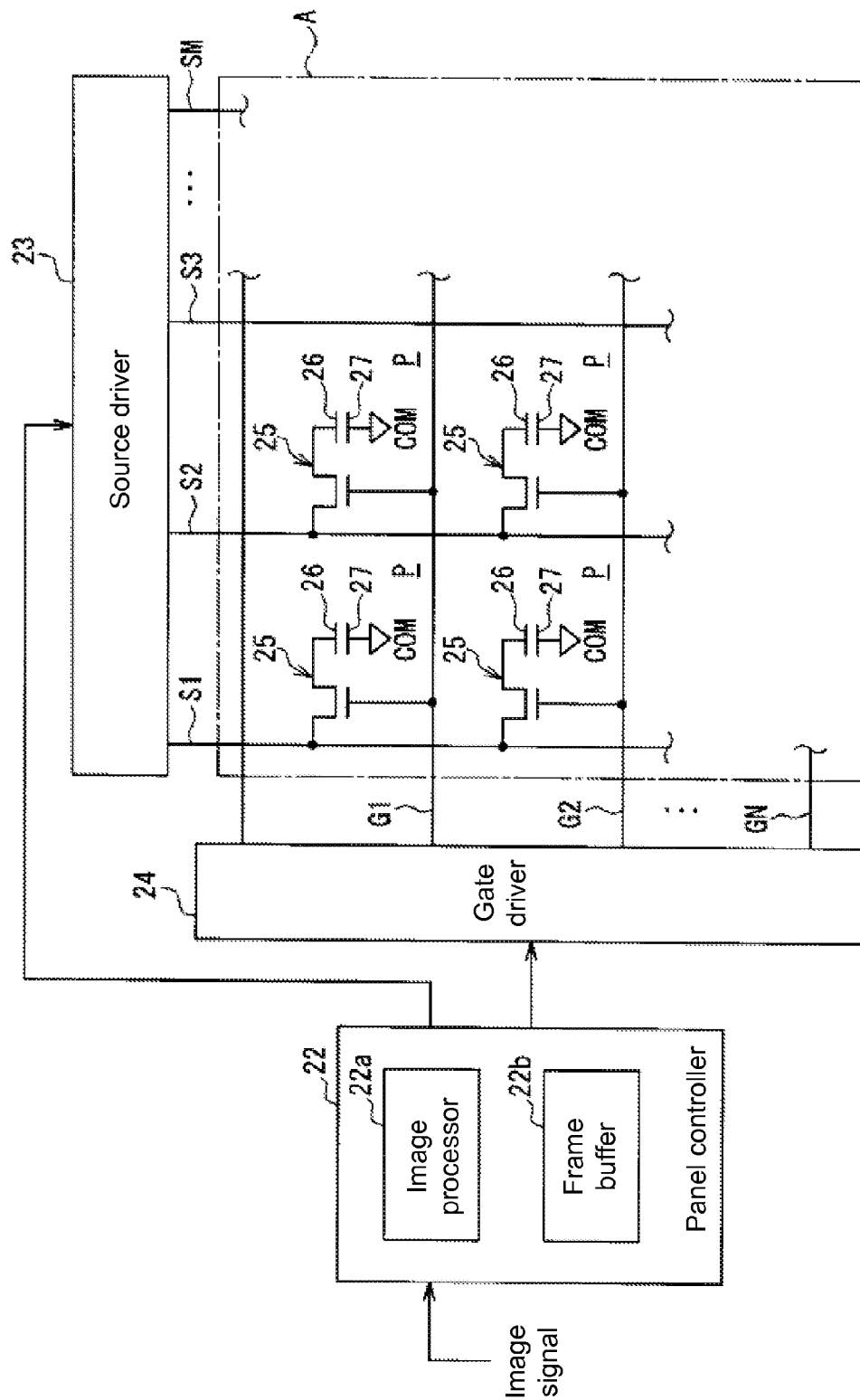
FIG. 2 is a drawing for explanation of the configuration of relevant parts of the active matrix substrate and the liquid crystal display device of an embodiment of the present invention.

FIG. 2 is a drawing for explanation of configuration of relevant parts of the active matrix substrate and the liquid crystal display device of an embodiment of the present invention.

In FIG. 2, the liquid crystal display device 1 (FIG. 1) is equipped with a panel controller 22 for performing drive control of the liquid crystal panel 2 (FIG. 1) as the aforementioned display part for display of information such as characters, images, or the like, and the liquid crystal display device 1 is also provided with a source driver 23 and a gate driver 24 for operation based on command signals from this panel controller 22.

The panel controller 22 is provided for the drive circuit device 10 (FIG. 1) and receives as input an image signal from outside the liquid crystal display device 1. Moreover, the panel controller 12 is provided with an image processor 22*a* for performing prescribed image processing with respect to the inputted image signal and for generation of various command signals sent to the source driver 23 and gate drive 24, and the panel controller 22 is also provided with a frame buffer 22*b* capable of storing a single frame part of the display data included in the inputted image signal. By performing drive control of the source driver 23 and the gate driver 24 according to the inputted image signal, the panel controller 22 causes the liquid crystal panel 2 to display information according to the image signal.

The source driver 23 and the gate driver 24 are provided on the driver device 9 (FIG. 1), and they constitute an array substrate placed on the active matrix substrate 5 of the present embodiment. Specifically, the source driver 23 is placed on the surface of the active matrix substrate 5 and along the lateral direction of the liquid crystal panel 2 in a region outside the effective display region A of the liquid crystal panel 2, which is effective as the display panel. The gate driver 24 is placed on the surface of the active matrix substrate 5 and along the vertical direction of the liquid crystal panel 2 in a region outside the aforementioned effective display region A of the liquid crystal panel 2.

Moreover, the source driver 23 and the gate driver 24 are drive circuits that drive multiple picture elements P provided on the liquid crystal panel 2 side in picture element units. The source driver 23 is connected to multiple source wiring lines S1 through SM (M is an integer having a value of 2 or greater; these wiring lines are referred to collectively below as S). The gate driver 24 is connected to multiple gate wiring lines G1 through GN (N is an integer having a value of 2 or greater; these wiring lines are referred to collectively below as G). These source wiring lines S constitute data wiring lines, and these gate wiring lines G constitute scan wiring lines. The data wiring lines and the scan wiring lines are arrayed in a matrix pattern so as to mutually intersect on the below described base member.

In the vicinity of the intersections of the source wiring line S and the gate wiring line G, the aforementioned picture elements P are provided, which have a thin film transistor 25 provided as a switching element and have a picture element electrode 26 connected to the thin film transistor 25. That is to say, in each region of the active matrix substrate 5 sub-divided in a matrix pattern by the source wiring lines S and the gate wiring lines G, multiple picture elements P are formed. These multiple picture elements P include red colored, green colored, and blue colored picture elements. These red colored, green colored, and blue colored picture elements are arranged sequentially in that order, for example, parallel to each of the gate wiring lines G1 through GN.

The gate electrode of a respective thin film transistor 25 is connected to each gate wiring line G1 through GN and is provided for each picture element P. Each source wiring line S1 though SM is connected to the source electrode of the respective thin film transistor 25. The aforementioned picture element electrode 26 provided for each picture element P is connected to the drain electrode of the respective thin film transistor 25. A common electrode 27 is formed opposite the picture element electrode 26 so as to sandwich the liquid crystal layer 4 provided for the liquid crystal panel 2 between the common electrode 27 and the picture element electrode 26 at each picture element P.

The structure of the picture element P will be explained concretely for the active matrix substrate 5 of the present embodiment while referring to FIGS. 3 to 7.

Figure 3:
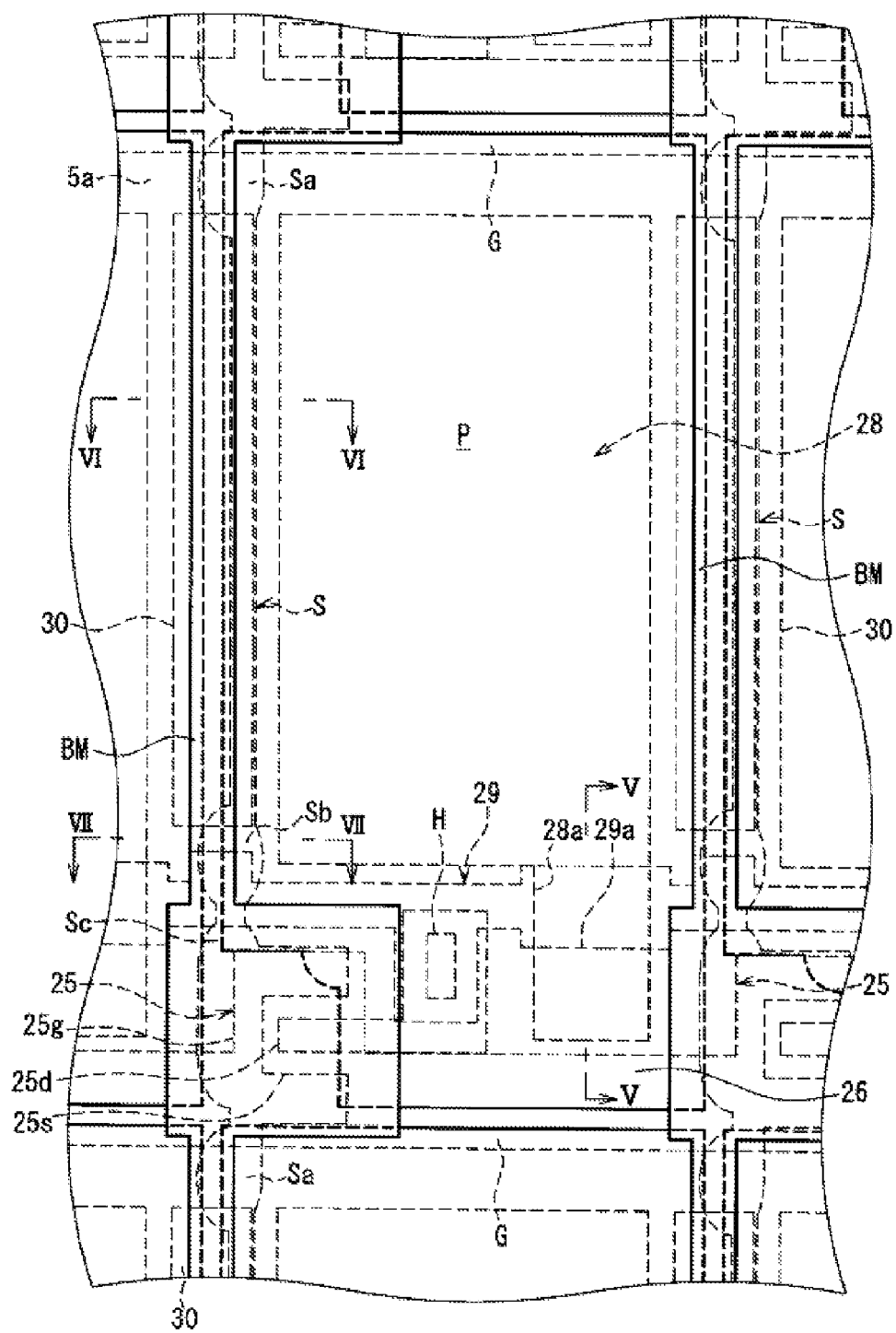
FIG. 3 is a drawing for concrete explanation of the structure of a picture element shown in FIG. 2.
Figure 4A:
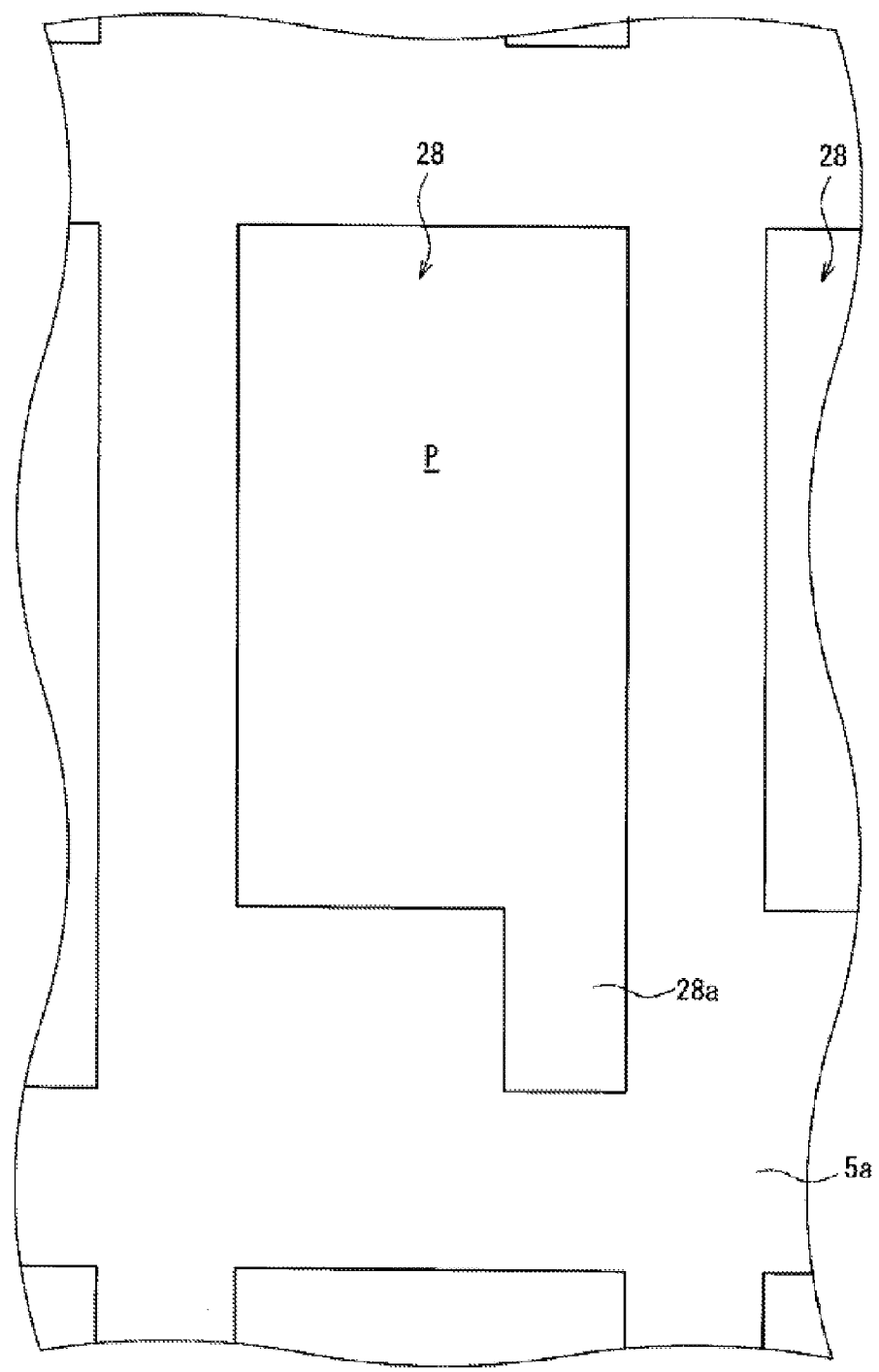
FIG. 4A is a top view showing the structure of the auxiliary capacitor electrode shown in FIG. 3.
Figure 4B:
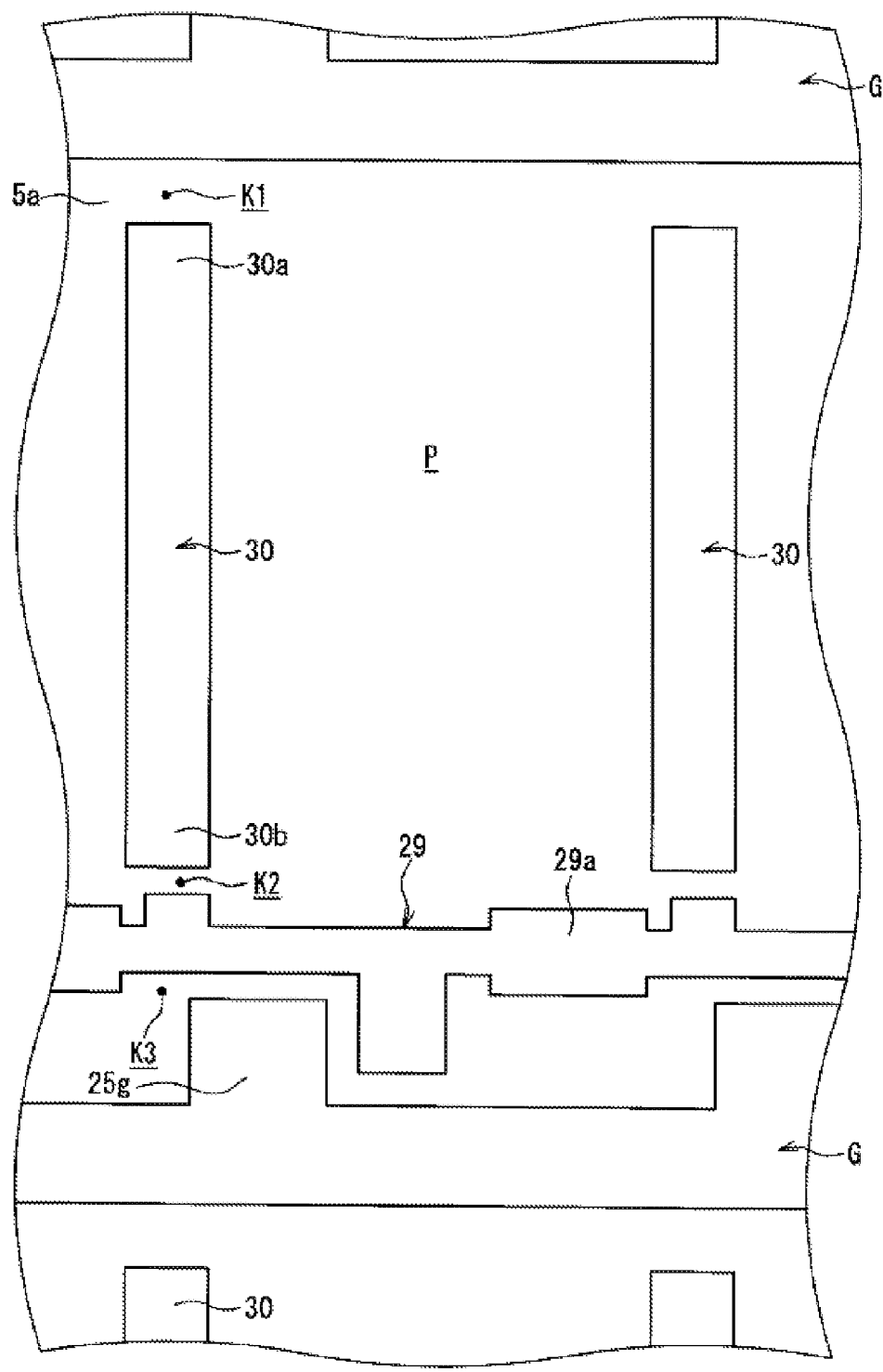
FIG. 4B is a top view showing the structure of the gate wiring line, auxiliary capacitor electrode, and light-shielding block shown in FIG. 3.
Figure 4C:
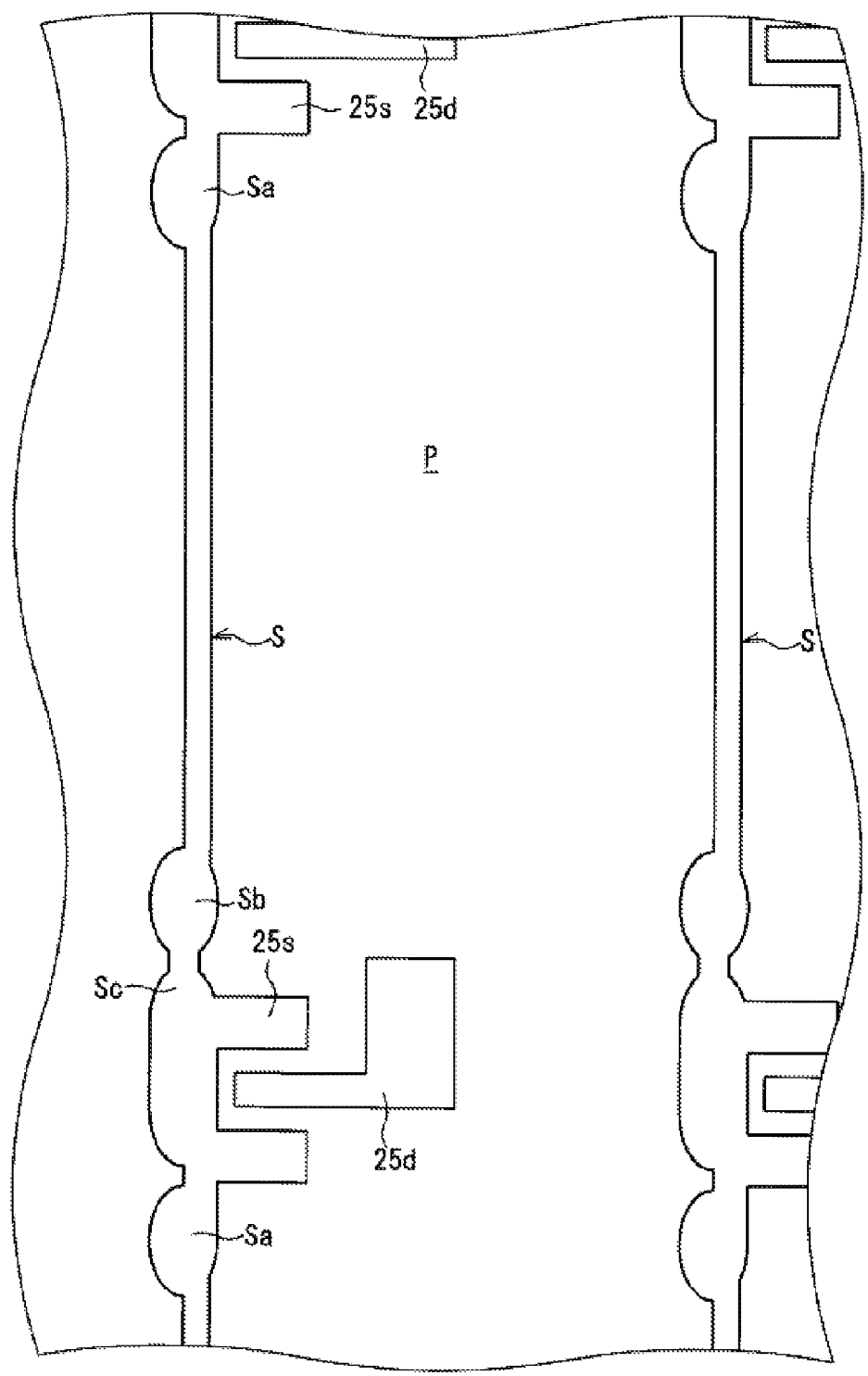
FIG. 4C is a top view showing the structure of the source wiring line shown in FIG. 3.
Figure 4D:
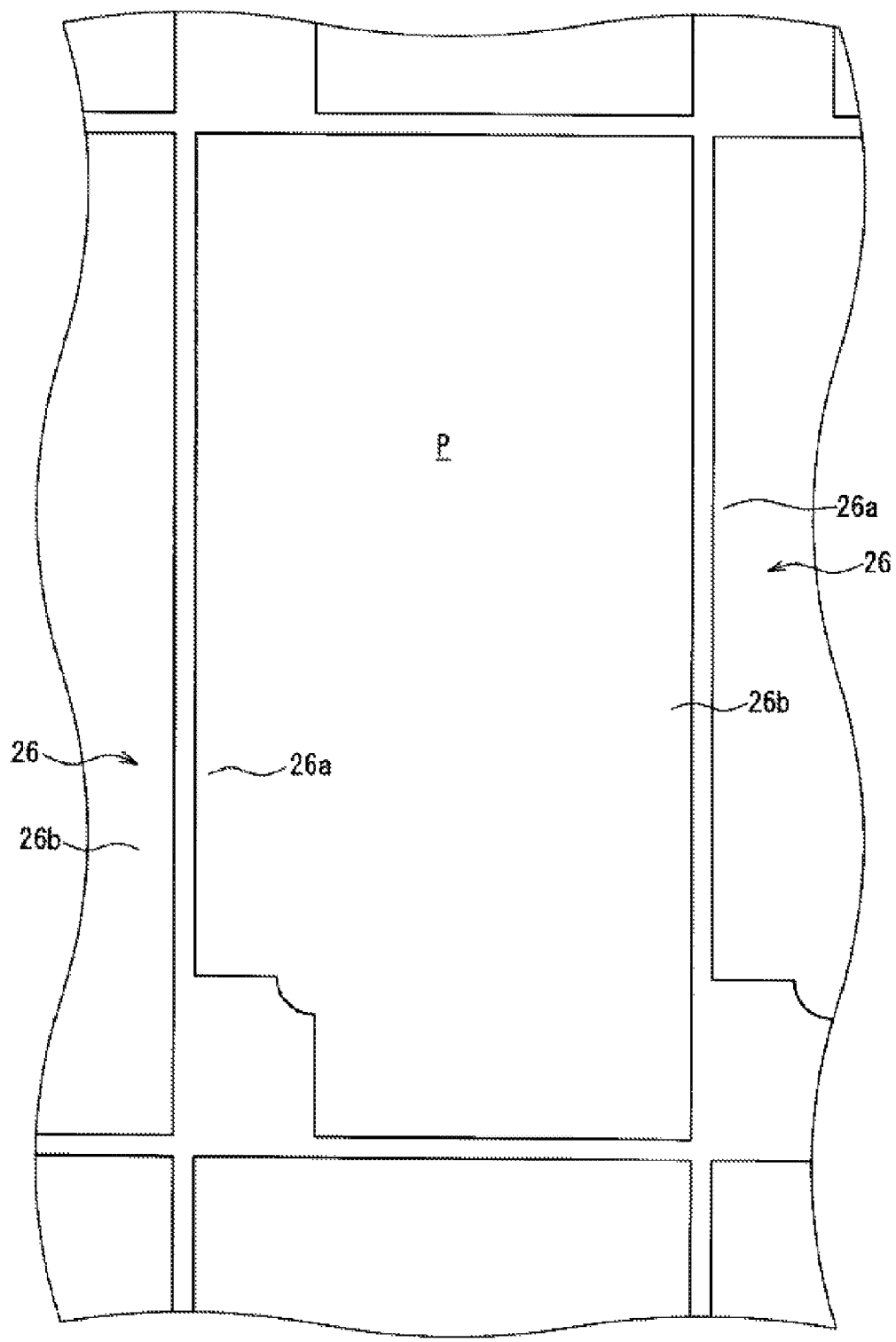
FIG. 4D is a top view showing the structure of the picture element electrode shown in FIG. 3.
Figure 5:
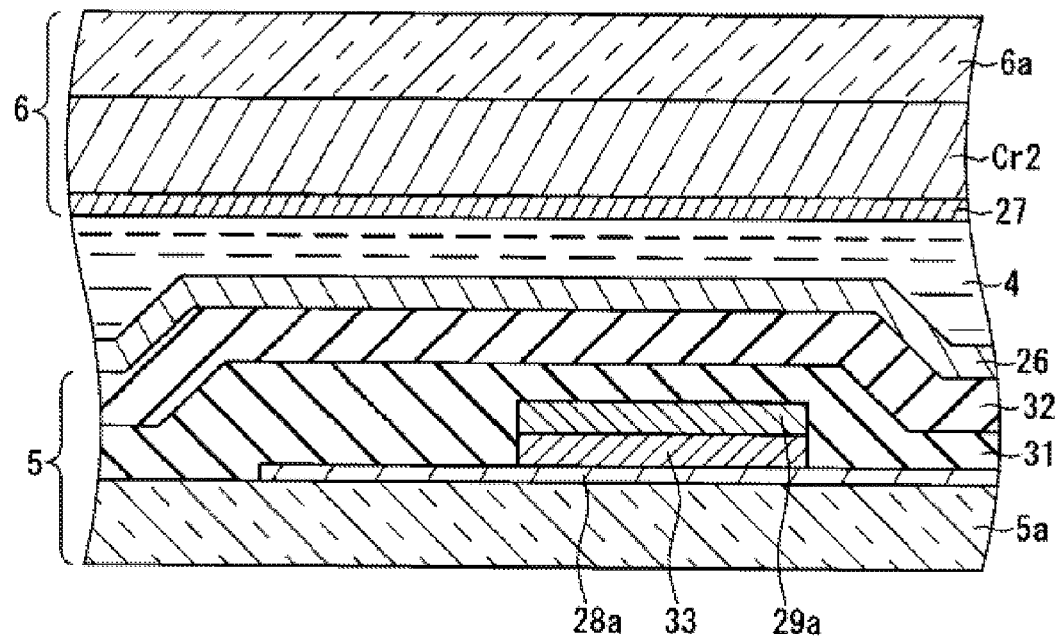
FIG. 5 is a cross-sectional view along the line V-V in FIG. 3.
Figure 6:
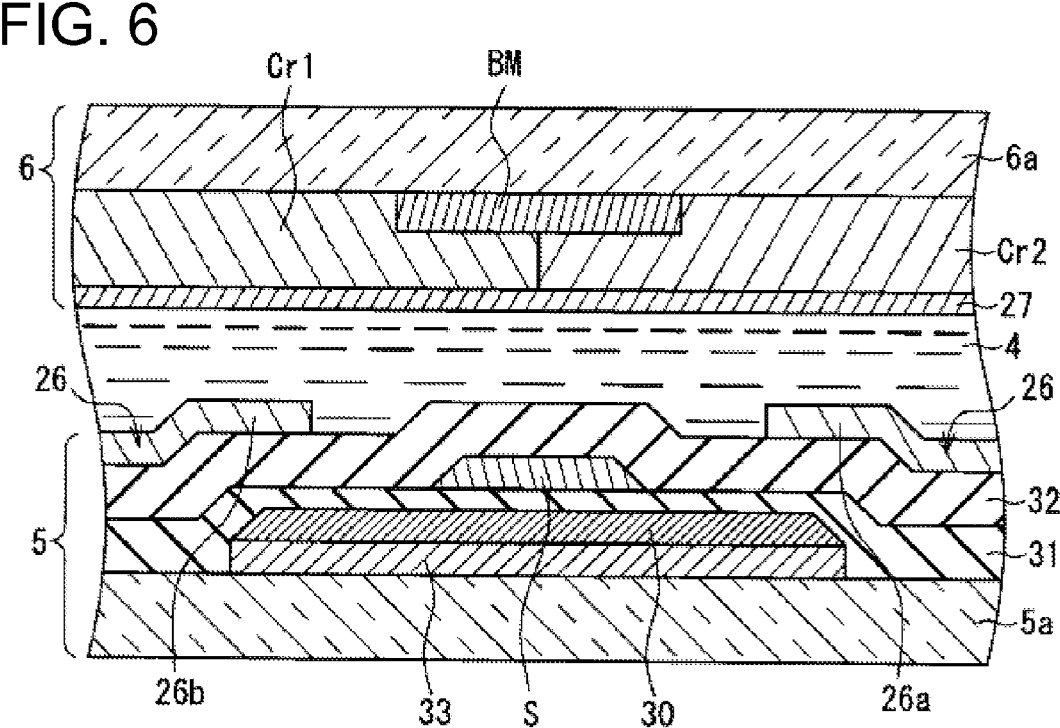
FIG. 6 is a cross-sectional view along the line VI-VI in FIG. 3.
Figure 7:
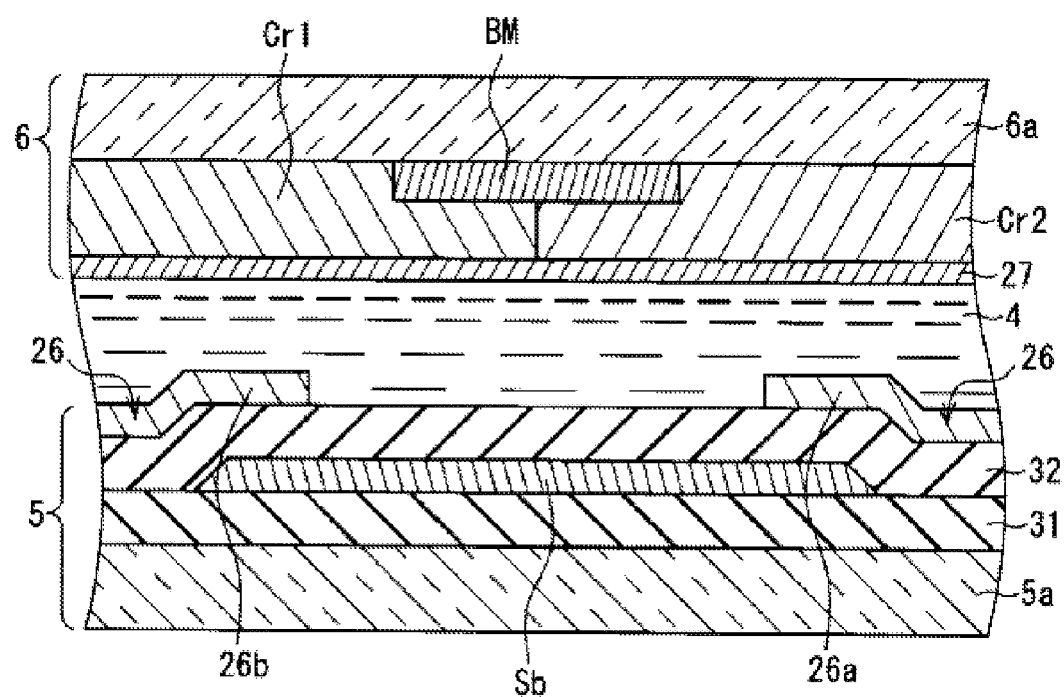
FIG. 7 is a cross-sectional view along the line VII-VII in FIG. 3.

FIG. 3 is a drawing for explanation of the concrete structure of the picture element shown in FIG. 2. FIG. 4A is a top view showing the structure of the auxiliary capacitor electrode shown in FIG. 3. FIG. 4B is a top view showing the structure of the gate wiring line, auxiliary capacitor wiring line, and light-shielding block shown in FIG. 3. FIG. 4C is a top view showing the structure of the source wiring line shown in FIG. 3. FIG. 4D is a top view showing the structure of the picture element electrode shown in FIG. 3. FIG. 5 is a cross-sectional view along the line V-V in FIG. 3. FIG. 6 is a cross-sectional view along the line VI-VI in FIG. 3. FIG. 7 is a cross-sectional view along the line VII-VII in FIG. 3.

As shown in FIG. 3, on the active matrix substrate 5, the source wiring lines S are provided extending in parallel and vertically as seen in FIG. 3, and the gate wiring lines G are provided extending in parallel and laterally as seen in FIG. 3. The region of the picture element P is determined by 2 bordering source wiring lines S and 2 bordering gate wiring lines G. Black matrix BM, which is arranged on the color filter substrate 6 (FIG. 1) side, is placed above the source wiring lines S and the thin film transistor 25.

On the active matrix substrate 5, the source wiring lines S, gate wiring lines G, thin film transistor 25, picture element electrode 26, auxiliary capacitor electrode 28, auxiliary capacitor wiring line 29, and light-shielding block 30 are formed on a base member 5*a* formed, for example, from transparent glass material or synthetic plastic material. Also, directly underneath each of the gate wiring lines G, auxiliary capacitor wiring lines 29, and light-shielding blocks 30 is formed the below described nitride film. The nitride film is provided on the base member 5*a* and is patterned so as to have the same shapes as the corresponding gate wiring line G, auxiliary capacitor wiring line 29, and light-shielding block 30.

In particular, as shown in FIGS. 4A and 4B, the auxiliary capacitor electrode 28, gate wiring line G, auxiliary capacitor wiring line 29, and light-shielding block 30 are provided directly on the base member 5*a* of the active matrix substrate 5. The gate electrode 25*g* of the thin film transistor 25 is integrally provided with the gate wiring line G. As described above, the aforementioned nitride film is formed immediately below each of the aforementioned gate wiring lines G, auxiliary capacitor wiring lines 29, and light-shielding blocks 30 of the active matrix substrate 5.

According to the active matrix substrate 5 of the present embodiment, the auxiliary capacitor electrode 28 is firstly formed on the base member 5*a*, for example, by use of photolithography. Thereafter, the aforementioned nitride film is formed, for example, by the magnetron sputtering method. Then the gate wiring line G, auxiliary capacitor wiring line 29, and light-shielding block 30 are formed simultaneously from the same material, for example, by the photolithography method. Specifically, the auxiliary capacitor electrode 28 is formed by a transparent electrode on the base member 5*a* in a prescribed pattern by a prescribed production process such as using a mask for exposure, etching, or the like. Thereafter, the magnetron sputtering method is used to form the aforementioned nitride film including the below described high melting point metal material, and the below described metal material which will become the gate wiring line G, auxiliary capacitor wiring line 29, and light-shielding block 30. This is followed by performance of a prescribed production process such as exposure using a mask, etching, or the like to form respective patterns on the base member 5a at once. As described below, these gate wiring lines G, auxiliary capacitor wiring lines 29, and light-shielding blocks 30 are constituted by aluminum alloy.

Rather than the aforementioned configuration, the aforementioned nitride film may also be formed directly under only the auxiliary capacitor wiring line 29 or under just the gate wiring line G and auxiliary capacitor wiring line 29.

At the location of connection between the auxiliary capacitor electrode 28 and the auxiliary capacitor wiring line 29 on the base member 5a of the active matrix substrate 5 of the present embodiment, the auxiliary capacitor wiring line 29 is provided above the auxiliary capacitor electrode 28 and connects to the auxiliary capacitor electrode 28 with the aforementioned nitride film between the auxiliary capacitor wiring line 29 and the auxiliary capacitor electrode 28.

Specifically, a connecting portion 28a and a connecting portion 29a are formed at the auxiliary capacitor electrode 28 and the auxiliary capacitor wiring line 29, respectively, for electrically connecting the capacitor electrode 28 to the auxiliary capacitor wiring line 29. As shown in FIG. 5, at the connecting portion 28a and the connecting portion 29a, the connecting portion 28a of the auxiliary capacitor electrode 28 is formed on the base member 5a. Above the connecting portion 28a of the auxiliary capacitor electrode 28, the aforementioned nitride film 33 containing a high melting point metal material is stacked, and above the nitride film 33, the connecting portion 29a of the auxiliary capacitor wiring line 29 is provided so as to cover the nitride film 33. The connecting portion 28a and the connecting portion 29a are connected together electrically through the nitride film 33, and the auxiliary capacitor electrode 28 and the auxiliary capacitor wiring 29 are also electrically connected together. In the active matrix substrate 5 of the present embodiment, it is possible to ensure good bonding between the nitride film 33 and the auxiliary capacitor electrode 28 by use of the nitride film 33 (as will be explained in detail below).

According to the liquid crystal display device 1 of the present embodiment, as shown in FIG. 5, the connecting portion 28a, nitride film 33, and connecting portion 29a are provided on the base member 5a of the active matrix substrate 5, and a transparent insulating film 31 and a transparent insulating film 32 are formed sequentially so as to cover the connecting portion 28a, nitride film 33, and connecting portion 29a. As shown in the same FIG. 5, the color filter substrate 6 is provided above the connecting portion 28a, nitride film 33, and connecting portion 29a with a base member 6a, a color filter layer Cr2 formed upon the base member 6a, and a common electrode 27 covering the color filter layer Cr2. This base member 6a is formed, for example, from a transparent glass material or synthetic plastic material, similarly to the base member 5a. The color filter layer Cr2 is constituted by one of the color filters: red (R), green (G), or blue (B).

The auxiliary capacitor electrode 28 is able to generate a prescribed auxiliary capacitance between the auxiliary capacitor electrode 28 and the picture element electrode 26 when a voltage is applied from a power source, not shown in the drawing, to the auxiliary capacitor wiring line 29.

The material of the auxiliary capacitor electrode 28 and the auxiliary capacitor wiring line 29 can be selected appropriately so as not to dissolve in the development solution (e.g., tetramethyl ammonium hydroxide (TMAH) that is used during patterning of the gate wiring line G, this auxiliary capacitor wiring line 29, and the light-shielding block 30 into prescribed shapes. The materials of the auxiliary capacitor electrode 28 and the auxiliary capacitor wiring line 29 can be selected appropriately so as to allow for the suppression of high resistance between the auxiliary capacitor electrode 28 and the auxiliary capacitor wiring line 29 (i.e., contact resistance), and coupled with the aforementioned prevention of dissolution, it is possible to reliably prevent lowering of electrical connectivity between the auxiliary capacitor electrode 28 and the auxiliary capacitor wiring line 29.

Specifically, indium tin oxide (ITO), for example, is used for a transparent electrically conductive film as the aforementioned transparent auxiliary capacitor electrode 28. Rather than the present embodiment, the auxiliary capacitor electrode 28 may also be configured using a transparent electrically conductive film such as indium zinc oxide (IZO), indium germanium oxide (IGO), or the like.

The aforementioned aluminum alloy is used for this auxiliary capacitor wiring line 29, and this aluminum alloy is made of aluminum and includes at least one of carbon, silicon, cobalt, nickel, germanium, rhodium, palladium, and tin as an additive. Increase of the value of resistance between the auxiliary capacitor electrode 28 and the auxiliary capacitor wiring line 29 of the active matrix substrate 5 of the present embodiment can be suppressed in this way, and it becomes possible to reliably prevent lowering of electrical connectivity between the auxiliary capacitor electrode 28 and the auxiliary capacitor wiring line 29.

By setting the total amount of the aforementioned additive to a value greater than or equal to 0.2 percent by weight and less than or equal to 5.0 percent by weight in the aluminum alloy forming the auxiliary capacitor wiring line 29 of the active matrix substrate 5 of the present embodiment, while reliably suppressing increase of the value of resistance between the auxiliary capacitor electrode 28 and the auxiliary capacitor wiring line 29 of the active matrix substrate 5, it becomes possible to reliably prevent lowering of electrical connectivity between the auxiliary capacitor electrode 28 and the auxiliary capacitor wiring line 29. An aluminum alloy (auxiliary capacitor wiring line 29) is used that has a sheet resistance, for example, of about 0.1 to 0.4Ω/□, and it becomes possible to suppress as much as possible electrical power consumption by the auxiliary capacitor wiring line 29.

A high melting point metal material with a melting point of at least 1,000° C., such as molybdenum, tantalum, or titanium, can be used for the nitride film 33. Bonding between such a nitride film 33 and the auxiliary capacitor electrode 28 can be readily ensured. The nitrogen content (doping amount) in the nitride film 33 is set to greater than or equal to 5 percent by weight and less than or equal to 90 percent by weight, and it is possible to readily ensure bonding between such a nitride film 33 and the auxiliary capacitor electrode 28.

In the active matrix substrate 5 of the present embodiment, the auxiliary capacitor electrode 28 and the auxiliary capacitor wiring line 29 are electrically connected in a state that prevents direct contact between the auxiliary capacitor electrode 28 and the auxiliary capacitor wiring line 29 by interposing the nitride film 33 at the location of connection between the auxiliary capacitor electrode 28 and the auxiliary capacitor wiring line 29. This way, in the active matrix substrate 5 of the present embodiment, it is possible to reliably suppress the occurrence of galvanic corrosion or the like due to the great difference in corrosion potential between the auxiliary capacitor electrode 28 and the auxiliary capacitor wiring line 29.

Table 1 and Table 2 show specific examples of results of testing during investigatory testing by the inventor of the present invention.

In these investigatory tests, resistivity to the aforementioned developing solution was examined while the composition of the auxiliary capacitor wiring line 29 was varied. That is to say, dissolution occurred due to the developing solution, and an examination was made as to whether or not there was a decline in electrical connectivity with the auxiliary capacitor electrode 28. An examination was also made as to whether or not there was a major increase in resistance value (contact resistance) between the auxiliary capacitor electrode 28 and the auxiliary capacitor wiring line 29. In Table 1, a "◯" symbol indicates that both resistance to the developing solution and contact resistance were good. A symbol of "X" indicates that either resistance to the developing solution or contact resistance was poor.

TABLE 1

| Auxiliary capacitor wiring line | |
|---|---|
| Weight percent of additive in the aluminum alloy | Test result |
| 0.10% | X |
| 0.20% | ◯ |
| 0.50% | ◯ |
| 0.70% | ◯ |
| 1.00% | ◯ |
| 3.20% | ◯ |
| 4.50% | ◯ |
| 5.00% | ◯ |
| 6.00% | X |

As shown in Table 1, by forming the auxiliary capacitor electrode 28, for example, from ITO, and by using for the auxiliary capacitor wiring line 29 an aluminum alloy having the aforementioned additive amount set to a value within the range greater than or equal to 0.2 percent by weight and less than or equal to 5.0 percent by weight, it was demonstrated that it was possible to suppress the resistance between the auxiliary capacitor electrode 28 and the auxiliary capacitor wiring line 29 to a value less than or equal to 100Ω. It was found that the lowering of electrical connectivity between the auxiliary capacitor electrode 28 and the auxiliary capacitor wiring line 29 could be more reliably prevented.

When content of the additive was less than 0.2 percent by weight, the value of resistance between the auxiliary capacitor electrode 28 and the auxiliary capacitor wiring line 29 exceeded 100Ω, and it was not possible to suppress the increase of this resistance value. On the other hand, when the content of the additive exceeded 5.0 percent by weight, the auxiliary wiring line 29 was dissolved by the aforementioned developing solution, and electrical connectivity with the auxiliary capacitor electrode 28 declined.

In separate verification testing, as the nitrogen content of the nitride film 33 was varied, an examination was made as to whether or not bonding with the auxiliary capacitor electrode 28 was good. In Table 2, a "◯" symbol indicates that the aforementioned bonding was good, and a symbol of "X" indicates that bonding was poor.

TABLE 2

| Nitride film | |
|---|---|
| Weight percent nitrogen in the nitride film | Test result |
| 3.0% | X |
| 5.0% | ◯ |
| 10.0% | ◯ |
| 30.0% | ◯ |
| 50.0% | ◯ |
| 70.0% | ◯ |
| 90.0% | ◯ |
| 95.0% | X |

As shown in Table 2, when the value of the content of nitrogen in the nitride film 33 was set in a range of greater than or equal to 5 percent by weight and less than or equal to 90 percent by weight, bonding between the nitride film 33 and the auxiliary capacitor electrode 28 was verified to have been good. The aforementioned bonding ability was found to improve as the weight-basis content of nitrogen increased.

When the weight-basis content was less than 5 percent, bonding was poor, and there was a lowering of electrical connectivity between the auxiliary capacitor electrode 28 and the auxiliary capacitor wiring line 29. On the other hand, it was difficult to form the nitride film 33 when the weight-basis content exceeded 90 percent.

As shown in FIG. 4B, the light-shielding block 30 is provided on the base member 5a so that the end part 30a does not contact the gate wiring line G, and so that the end part 30b does not contact the auxiliary capacitor wiring line 29. That is to say, the light-shielding block 30 is arranged on the base member 5a such that a separation region K1 is formed where there is no contact between the end part 30a and the gate wiring line G, and such that a separation region K2 is formed where there is no contact between the end part 30b and the auxiliary capacitor wiring line 29. The gate wiring line G and the auxiliary capacitor wiring line 29 are arranged on the substrate 5a so that a separation region K3 is formed so that there is no contact between the gate electrode 25g of this gate wiring line G and the auxiliary capacitor wiring line 29.

In the aforementioned manner, since the light-shielding block 30 does not contact the gate wiring line G or the auxiliary capacitor wiring line 29, the light-shielding block 30 is provided in an electrically floating state on the active matrix substrate 5, and the light-shielding block 30 is constructed so that no unnecessary parasitic capacitance arises between the light-shielding block 30 and the picture element electrode 26.

The light-shielding block 30 is placed on the base member 5a so as to oppose the edge parts 26a and 26b of two adjacent picture element electrodes 26 so that the light-shielding block 30 blocks light at the edges 26a and 26b of the two adjacent picture elements 26. The light-shielding block 30, together with the below described wide part provided in the source wiring line S, prevents light leakage between the two adjacent picture elements P (as explained in detail below).

The source wiring line S and the drain electrode 25d of the thin film transistor 25 are formed using prescribed patterns as shown in FIG. 4C. The source wiring line S and the drain electrode 25d, for example, are formed by deposition of an aluminum alloy film or a stacked film of aluminum alloy and high dielectric material. The source wiring line S and the drain electrode 25d are formed upon the base member 5a above the gate wiring line G, auxiliary capacitor electrode 28, auxiliary capacitor wiring line 29, and light-shielding block 30 with the below described insulating film therebetween. The source electrode 25s of the thin film transistor 25 is provided integrally with the source wiring line S. The drain electrode 25d is electrically connected to the picture element electrode 26 through a contact hole H (FIG. 3).

Wide parts Sa, Sb, and Sc, at which points the wiring line becomes wide, are provided in the source wiring line S. These wide parts Sa through Sc are formed so as to cover the aforementioned separation regions K1 through K3, respectively. The wide parts Sa through Sc block light at the corresponding separation regions K1 through K3, respectively. That is to say, the wide part Sa is formed so as to cover the separation region K1 between the gate wiring line G and the end part 30a of the light-shielding block 30, resulting in blocking of light at the separation region K1. The wide part Sb is formed so as to cover the separation region K2 between the auxiliary capacitor wiring line 29 and the end part 30b of the light-shielding block 30, resulting in blocking of light at the separation region K2. The wide part Sc is formed so as to cover the separation region K3 between the gate wiring line G and the auxiliary capacitor wiring line 29 so as to block light at the separation region K3.

As shown in FIG. 4D, the picture element electrode 26 is formed in a prescribed shape. This picture element electrode 26 is formed upon the base member 5a above the source wiring line S and the drain electrode 25d with a below described insulating film therebetween. This picture element electrode 26 is constituted by a transparent electrically conductive film such as an ITO film or the like. Corresponding light-shielding block 30 is provided below the end parts 26a and 26b of two adjacent picture element electrodes 26.

In the liquid crystal display device 1 of the present embodiment, as shown in FIG. 6, the light-shielding block 30 is provided on the base member 5a of the active matrix substrate, and an insulating film 31 is then formed so as to cover the light-shielding block 30. At a position directly about the central part of the light-shielding block 30, the active matrix substrate 5 is provided with a source wiring line S on the insulating film 31, and insulating film 32 is formed so as to cover this source wiring line S. In the active matrix substrate 5, the picture element electrode 26 is provided upon the insulating film 32.

In the active matrix substrate 5, the left end part of the light-shielding block 30 is provided so as to oppose the end part 26b of the left-side picture element electrode 26, and the right end part of the light-shielding block 30 is provided so as to oppose the end part 26a of the right-side picture element electrode 26. This way, the light-shielding block 30 is able to block light at both end parts 26a and 26b of the two adjacent picture element electrodes 26, and it becomes possible to more reliably prevent leakage of light between the two adjacent picture elements P. As a result, it is possible to reliably decrease the width of the black matrix BM of the liquid crystal display device 1 of the present embodiment.

As shown in FIG. 6, the source wiring line S and the picture element electrode 26 of the active matrix substrate 5 are provided at positions that are mutually separated in the vertical direction as viewed in the figure, and it is thus possible to greatly decrease parasitic capacitance generated between this source wiring line S and picture element electrode 26.

As shown in FIG. 6, above the source wiring line S is placed a color filter substrate 6 that is provided with a base member 6a, a black matrix BM formed upon this base member 6a, a color filter layer Cr1, a color filter layer Cr2, and a common electrode 27 provided so as to cover the color filter layers Cr1 and Cr2 and the black matrix BM. The color filter layers Cr1 and Cr2 are color filters of two mutually different colors from among the colors red (R), green (G), and blue (B).

At parts where a light-shielding block 30 is not provided, the liquid crystal display device 1 of the present embodiment is configured so as to prevent leakage of light between two adjacent picture elements P by use of wide parts Sa through Sc provided in the source wiring line S. Specifically, as illustrated in FIG. 7, at the aforementioned separation region K2, an insulation film 31 is provided upon the base member 5a, and a wide part Sb is formed upon this insulating film 31. The insulating film 32 is provided so as to cover the wide part Sb, and the picture element electrode 26 is further provided upon this insulating film 32. The left end part of the wide part Sb is provided so as to oppose the end part 26b of the left-side picture element electrode 26, and the right end part of the wide part Sb is provided so as to oppose the end part 26a of the right-side picture element electrode 26. This way, the wide part Sb is able to block light at the adjacent two end parts 26a and 26b of the two adjacent picture element electrodes 26, and it is possible to prevent leakage of light between the two adjacent picture elements P.

According to the active matrix substrate 5 of the present embodiment configured in the aforementioned manner, the auxiliary capacitor electrode 28 and the auxiliary capacitor wiring line 29 are connected with the nitride film 33 interposed therebetween. Thus, according to the active matrix substrate 5 of the present embodiment, it is possible to reliably connect together the auxiliary capacitor electrode 28 and the auxiliary capacitor wiring line 29 with the nitride film 33 interposed therebetween, while ensuring bonding between the nitride film 33 and the auxiliary capacitor electrode 28. As a result, according to the active matrix substrate 5 of the present embodiment, and in contrast to the aforementioned conventional example, it is possible to prevent lowering of electrical connectivity between the auxiliary capacitor electrode 28 and the auxiliary capacitor wiring line 29. Thus, the active matrix substrate 5 of the present embodiment makes possible the reliable addition of sufficient auxiliary capacitance to the picture element electrode 26, and it is possible to readily improve the display quality of the liquid crystal display device 1.

According to the present embodiment, an active matrix substrate 5 capable of preventing lowering of electrical connectivity between the auxiliary capacitor electrode 28 and the auxiliary capacitor wiring line 29 is used in the liquid crystal panel (display part) 2. It is thus possible to readily construct a high-performance liquid display device 1 that has a liquid crystal panel 2 having excellent display quality.

Although a structure was explained above that provided the color filter substrate 6 with the black matrix BM, the liquid crystal display device 1 of the present embodiment is able to prevent light leakage between two adjacent pixel elements P by the light-shielding block 30 and the wide parts Sa through Sc of the source wiring line S. Thus, for the liquid crystal display device 1 of the present embodiment, it is possible to omit the installation of the black matrix BM.

The aforementioned embodiments are illustrative and are not limiting. The technical scope of the present invention is limited by the claims, and all variations within a scope equivalent to the configuration mentioned in the claims are included in the technical scope of the present invention.

For example, in the above description, the present invention was applied to a transmission type liquid crystal display device. However, the display device of the present invention may be any display device using a display panel equipped with an active matrix substrate. That is to say, the display device of the present invention may be any display device using an active matrix substrate that has multiple data wiring lines and scan wiring lines that are arranged in a matrix pattern, picture elements that each have a switching element provided in the vicinity of a part where each data wiring line and each scan wiring line intersect each other, and a picture element electrode connected to the switching element.

Specifically, the display device of the present invention can be used for various types of display devices that use an active matrix substrate, as exemplified by transflective type or reflective type liquid crystal panels, organic electronic luminescence (EL) elements, inorganic EL elements, field emission displays, or the like.

According to the above description, the light-shielding block, gate wiring line (scan wire), and auxiliary capacitor wiring line were formed using the same material on the base member, and the source wiring line (data wiring line) was provided above the light-shielding block, scan wiring line, and auxiliary capacitor wiring line. However, the active matrix substrate of the present invention can be any active matrix substrate that is equipped with a base member provided with data wiring lines and scan lines so that the data wiring lines and scan lines intersect one another, or that is provided with an auxiliary capacitor electrode constructed from a transparent electrode for generation of an auxiliary capacitance and provided for each picture element, or that is provided with an auxiliary capacitor wiring line formed from aluminum alloy, and that connects together the auxiliary capacitor electrode and the auxiliary capacitor wiring line with a metal material nitride film therebetween.

Specifically, a configuration is also permissible in which, for example, the scan wiring line is provided above the data wiring line, the auxiliary capacitor wiring line is provided in a layer different from that of the light-shielding block and scan wiring line, and this auxiliary capacitor wiring line is arranged so as to pass through the roughly central parts of two adjacent scan wiring lines. A configuration is also permissible in which a light-shielding block is constructed using an organic compound such as a synthetic plastic or the like, where the light-shielding block is constructed in a single-line linear arrangement, and the light-shielding block is provided in a layer different from that of the scan wiring line and the auxiliary capacitor wiring line. Furthermore, if a single-line linear shaped light-shielding block is used as described above, in contrast to the aforementioned embodiment, it is possible to prevent leakage of light between two adjacent picture elements P by just using this light-shielding block alone, without forming the aforementioned wide parts in the source wiring line.

As described in the aforementioned embodiment, by forming the auxiliary capacitor wiring lines and the scan wiring lines from the same material, these auxiliary capacitor wiring lines and scan wiring lines can be formed simultaneously, which is preferable from the standpoint of the ability to readily simplify the manufacturing process of the active matrix substrate.

In the above description, a configuration is described in which the auxiliary capacitor wiring line is provided above the auxiliary capacitor electrode at the position of connection between the auxiliary capacitor electrode and the auxiliary capacitor wiring line, and contact is made with the auxiliary capacitor electrode with the nitride film interposed between the auxiliary capacitor wiring line and the auxiliary capacitor electrode. However, the present invention is not limited to this configuration, and a configuration is permissible in which, at the position on the substrate at which the auxiliary capacitor electrode is connected to the auxiliary capacitor wiring line, mutual connection is made by forming the nitride film and the auxiliary capacitor electrode in that order above the auxiliary capacitor wiring line.

Providing the auxiliary capacitor electrode, the nitride film, and the auxiliary capacitor wiring line in that order over the base member, as in the above embodiment, is preferred from the standpoint of the ability to readily ensure bonding between the auxiliary capacitor electrode and the nitride film.

Moreover, the above description described widening of the source wiring line (data wiring line) so as to cover a separation region where there is no contact between the gate wiring line (scan wire) and the end part of the light-shielding block, and so as to cover a separation region where there is no contact between the auxiliary capacitor wiring line and the end part of the light-shielding block. However, the display device of the present invention is not limited to this configuration, and a configuration is permissible in which, for example, the black matrix is partially widened so as to cover each of the aforementioned separation regions.

INDUSTRIAL APPLICABILITY

The present invention is useful for an active matrix substrate capable of preventing a decline of electrical connectivity between the auxiliary capacitor electrode and the auxiliary capacitor wiring line, and is also useful for a display device using this active matrix substrate.

DESCRIPTION OF REFERENCE CHARACTERS 1 liquid crystal display device (display device)
2 liquid crystal panel (display part)
5 active matrix substrate
5a base member
25 thin film transistor (switching element)
26 picture element electrode
28 auxiliary capacitor electrode
28a connecting portion
29 auxiliary capacitor wiring line
29a connecting portion
33 nitride film
S1-SM, S source wiring lines (data wiring lines)
G1-GN, G gate wiring lines (scan wiring lines)
P picture element

The invention claimed is:
1. An active matrix substrate for use as a substrate of a display panel, comprising:
   a base member;
   a plurality of data wiring lines and a plurality of scan wiring lines on the base member, which are arranged in a matrix pattern;
   a plurality of picture elements on the base member, each picture element including a picture element electrode connected to a switching element;
   an auxiliary capacitor electrode formed from a transparent electrically conductive film; and
   an auxiliary capacitor wiring line comprising an aluminum alloy,
   wherein said auxiliary capacitor electrode and said auxiliary capacitor wiring line are electrically connected to each other via a metal material film comprising nitride interposed between said auxiliary capacitor electrode and said auxiliary capacitor wiring line, and wherein an auxiliary capacitance generates between said auxiliary capacitor electrode and the picture element electrode of said picture element.

2. The active matrix substrate according to claim 1, wherein a high melting point metal material having a melting point greater than or equal to 1,000° C. is used as said metal material.

3. The active matrix substrate according to claim 1, wherein said metal material film contains nitrogen at a concentration greater than or equal to 5 percent by weight and less than or equal to 90 percent by weight.

4. The active matrix substrate according to claim 1, wherein, at the location of connection between said auxiliary capacitor electrode and said auxiliary capacitor wiring line, said auxiliary capacitor wiring line is arranged above said auxiliary capacitor electrode, and said auxiliary capacitor wiring line is connected to said auxiliary capacitor electrode with said metal material film interposed therebetween.

5. The active matrix substrate according to claim 1, wherein a said auxiliary capacitor wiring line includes at least one of carbon, silicon, cobalt, nickel, germanium, rhodium, palladium, and tin as an additive.

6. The active matrix substrate according to claim 5, wherein the total content of the additive in said auxiliary capacitor wiring line is greater than or equal to 0.2 percent by weight and less than or equal to 5.0 percent by weight.

7. The active matrix substrate according to claim 1, wherein said scan wiring line is formed from the same material as said auxiliary capacitor wiring line.

8. A display device comprising a display part, wherein said active matrix substrate according to claim 1 is included in said display part.

9. The active matrix substrate according to claim 1, further comprising a light-shielding block configured to suppress light leakage between two adjacent picture elements.

10. The active matrix substrate according to claim 9, wherein the light-shielding block is located near edge parts of two adjacent picture element electrodes to block light at the edges thereof.

11. The active matrix substrate according to claim 9, wherein the metal material film comprising nitride is interposed between the base member and the light-shielding block.

12. The active matrix substrate according to claim 9, wherein the light-shielding block is formed from the same material as the auxiliary capacitor wiring line and the scan wiring lines.

13. The active matrix substrate according to claim 9, wherein the data wiring line includes a first wide part covering a first separation region between the scan wiring line and the light-shielding block.

14. The active matrix substrate according to claim 9, wherein the data wiring line further includes a second wide part covering a second separation region between the auxiliary capacitor wiring line and the light-shielding block.

15. The active matrix substrate according to claim 9, wherein the data wiring line further includes a third wide part covering a third separation region between the auxiliary capacitor wiring line and the scan wiring line.

16. The active matrix substrate according to claim 1, wherein the metal material film comprising nitride is interposed between the base member and the scan wiring lines.

17. The active matrix substrate according to claim 16, wherein the picture element electrode is on the scan wiring lines, and an insulating film is between the picture element electrode and the scan wiring lines.

18. The active matrix substrate according to claim 17, wherein the source wiring line and the picture element electrode are mutually separated in a vertical direction.

19. The active matrix substrate according to claim 1, wherein the metal material film comprising nitride is between a connecting portion of the auxiliary capacitor electrode and a connecting portion of the auxiliary capacitor wiring line.

20. The active matrix substrate according to claim 19, wherein the connecting portion of the auxiliary capacitor electrode and the connecting portion of the auxiliary capacitor wiring line are connected electrically through the metal material film comprising nitride.

* * * * *